United States Patent
Townsend et al.

[11] Patent Number: 5,908,645
[45] Date of Patent: Jun. 1, 1999

[54] CONTINUOUS CHEWING GUM MANUFACTURE FROM BASE CONCENTRATE

[75] Inventors: Donald J. Townsend, Chicago; Joo H. Song, Northbrook; Kevin B. Broderick, Berwyn; Henry T. Tyrpin, Midlothian, all of Ill.

[73] Assignee: Wm. Wrigley Jr. Company, Chicago, Ill.

[21] Appl. No.: 08/658,300

[22] Filed: Jun. 5, 1996

Related U.S. Application Data

[63] Continuation of application No. 08/361,759, Dec. 22, 1994, abandoned, which is a continuation-in-part of application No. 08/305,363, Sep. 13, 1994, abandoned.

[51] Int. Cl.⁶ .................................................. A23G 3/30
[52] U.S. Cl. .................................................. 426/3; 426/6
[58] Field of Search ................................ 426/3–6

[56] References Cited

U.S. PATENT DOCUMENTS

| | | | |
|---|---|---|---|
| H1241 | 10/1993 | Synosky et al. | 426/3 |
| 1,852,005 | 4/1932 | Garbutt . | |
| 1,855,017 | 4/1932 | Geller | 426/6 |
| 1,887,930 | 11/1932 | Hatherell | 426/6 |
| 1,953,295 | 4/1934 | Garbutt | 99/11 |
| 2,123,531 | 7/1938 | Hatherell | 99/135 |
| 2,125,562 | 8/1938 | Hatherell | 99/135 |
| 2,197,240 | 4/1940 | Hatherell | 99/135 |
| 2,256,190 | 9/1941 | Bowman | 107/54 |
| 2,284,804 | 6/1942 | De Angelis | 99/135 |
| 2,288,100 | 6/1942 | Manson | 99/135 |
| 2,383,145 | 8/1945 | Moose | 99/135 |
| 2,468,393 | 4/1949 | Corkery et al. | 99/135 |
| 3,618,902 | 11/1971 | Brennan, Jr. et al. | 259/6 |
| 3,795,744 | 3/1974 | Ogawa et al. | 426/3 |
| 3,826,847 | 7/1974 | Ogawa et al. | 426/3 |
| 3,984,574 | 10/1976 | Comollo | 426/4 |
| 3,995,064 | 11/1976 | Ehrgott et al. | 426/3 |
| 4,064,274 | 12/1977 | Mackay et al. | 426/3 |
| 4,068,004 | 1/1978 | Carlin et al. | 426/3 |
| 4,187,320 | 2/1980 | Koch et al. | 426/3 |
| 4,202,906 | 5/1980 | Ogawa et al. | 426/3 |
| 4,208,431 | 6/1980 | Friello et al. | 426/3 |
| 4,217,368 | 8/1980 | Witzel et al. | 426/5 |
| 4,224,345 | 9/1980 | Tezuka et al. | 426/3 |
| 4,252,830 | 2/1981 | Kehoe et al. | 426/5 |
| 4,254,148 | 3/1981 | Ogawa et al. | 426/3 |
| 4,305,962 | 12/1981 | del Angel | 426/3 |
| 4,352,822 | 10/1982 | Cherukuri et al. | 426/4 |
| 4,357,354 | 11/1982 | Kehoe et al. | 426/3 |

(List continued on next page.)

FOREIGN PATENT DOCUMENTS

| | | | |
|---|---|---|---|
| 0273809 | 12/1987 | European Pat. Off. | A23G 3/30 |
| 0524902 | 7/1992 | European Pat. Off. | A23G 3/30 |
| 2635441 | 8/1988 | France | A23G 3/30 |
| 1538785 | 1/1979 | United Kingdom | C08J 3/20 |
| 2049705 | 12/1980 | United Kingdom | C08J 3/20 |
| WO95/08272 | 3/1995 | WIPO | A23G 3/30 |
| WO95/10194 | 4/1995 | WIPO | A23G 3/30 |
| WO95/10947 | 4/1995 | WIPO | A23G 3/30 |
| WO95/10948 | 4/1995 | WIPO | A23G 3/30 |

OTHER PUBLICATIONS

Brochure—"Buss Technology For The Continuous Compounding of Chewing Gum And Bubble Gum", Buss AG (Apr. 24, 1995).

Brochure—"Process Technology Guide No. 42", Buss AG (Aug. 22, 1983)—Swiss document with English Translation.

Brochure—"Production Of Chewing Gum And Bubble Gum Masses On the Buss Kneading Extruder", E. Strebel, Buss AG (Mar. 1985).

(List continued on next page.)

*Primary Examiner*—Milton Cano
*Attorney, Agent, or Firm*—Steven P. Shurtz; Brinks Hofer Gilson & Lione

[57] ABSTRACT

A method of making chewing gum includes the steps of a) preparing a gum base concentrate having a composition useful for preparing a variety of finished gum bases and chewing gums, and b) combining the gum base concentrate with remaining gum base ingredients, and other chewing gum ingredients, in a single efficient continuous mixer.

36 Claims, 5 Drawing Sheets

U.S. PATENT DOCUMENTS

| | | | |
|---|---|---|---|
| 4,379,169 | 4/1983 | Reggio et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |
| 4,459,311 | 7/1984 | DeTora et al. | 426/3 |
| 4,490,395 | 12/1984 | Cherukuri et al. | 426/3 |
| 4,514,423 | 4/1985 | Tezuka et al. | 426/3 |
| 4,515,769 | 5/1985 | Marritt et al. | 424/49 |
| 4,555,407 | 11/1985 | Kramer et al. | 426/5 |
| 4,590,075 | 5/1986 | Wei et al. | 426/5 |
| 4,711,784 | 12/1987 | Yang | 426/5 |
| 4,721,620 | 1/1988 | Cherukuri et al. | 426/6 |
| 4,738,854 | 4/1988 | Friello et al. | 426/3 |
| 4,740,376 | 4/1988 | Yang | 426/5 |
| 4,794,003 | 12/1988 | Cherukuri et al. | 426/6 |
| 4,816,265 | 3/1989 | Cherukuri et al. | 426/5 |
| 4,850,842 | 7/1989 | Van Alstine | 425/205 |
| 4,872,884 | 10/1989 | Cherukuri et al. | 426/3 |
| 4,876,095 | 10/1989 | Yang | 426/3 |
| 4,882,172 | 11/1989 | Van Alstine | 425/113 |
| 4,933,189 | 6/1990 | Cherukuri et al. | 426/3 |
| 4,940,594 | 7/1990 | Van Alstine | 426/231 |
| 4,968,511 | 11/1990 | D'Amelia et al. | 426/6 |
| 4,992,280 | 2/1991 | Yung Chu et al. | 426/5 |
| 5,023,093 | 6/1991 | Cherukuri et al. | 426/3 |
| 5,045,325 | 9/1991 | Lesko et al. | 426/5 |
| 5,059,103 | 10/1991 | Bruckmann et al. | 425/67 |
| 5,075,291 | 12/1991 | DuRoss | 514/60 |
| 5,110,607 | 5/1992 | Yang | 426/3 |
| 5,135,760 | 8/1992 | Degady et al. | 426/5 |
| 5,158,725 | 10/1992 | Handa et al. | 264/40.7 |
| 5,158,789 | 10/1992 | DuRoss | 426/3 |
| 5,324,530 | 6/1994 | Kehoe et al. | 426/516 |
| 5,397,580 | 3/1995 | Song et al. | 426/5 |
| 5,413,799 | 5/1995 | Song et al. | 426/3 |
| 5,415,880 | 5/1995 | Song et al. | 426/3 |
| 5,419,919 | 5/1995 | Song et al. | 426/5 |
| 5,562,936 | 10/1996 | Song et al. | 426/3 |
| 5,612,071 | 3/1997 | Song et al. | 426/3 |

OTHER PUBLICATIONS

Swiss Article—"Herstellung Und Aromatisierung Von Kaugummi Auf Basis Von Saccharose Und Zuckeraustauschstoffen", H. Mueller (Jan. 1981).
Article—"Chewing Gum Formulation", D. Fritz, *The Manufacturing Confectioner* (Sep. 1988).
Article—"Chewing Gum", Axel H. Suck, *H&R Edition* (date unknown).
Buss AG Correspondence of Jan. 2, 1986; Mar. 11, 1986; May 8, 1986 and Jun. 4, 1986 (may refer to other prior art).
"Leistritz Extrusionstechnik: The Multi–Extrusion System For Mixing, Kneading And Strandextrusion", by American Leistritz Extruder Corp. (undated).
"Buss Technology For The Continuous Compounding Of Gum Base", by George Fischer of Buss Gruppe (Apr. 22, 1995).
"Buss Technology For The Continuous Compounding Of Chewing Gum And Bubble Gum", by Bernd Rose of Buss Gruppe (Apr. 24, 1995).
"Rubber Extrusion Technology", Feb. 1993, including page entitled "Mixing In Extruders".
"The Teledyne Readco Continuous Processor", by Teledyne Readco Co. (date unknown).
"Extrusion: Does Chewing Gum Pass The Taste Test?", *Food Manufacture*, Sep. 1987, pp. 47–50.
"Mixing Process Used In The Manufacture Of Chewing Gum", R. Schilling, Werner & Pfleidener Co. (date unknown).
Letter dated Aug. 22, 1989, including attachment entitled "Buss Extrusion Technology" (1989).
"D–Tex Continuous Compounding Twin Screw Extruders", by Davis–Standard Co. (undated).
"Farrell–Rockstedt Twin–Screw Extruders", by Farrell Corp. (undated).
"Leistritz Extrusionstechnik: The Universal Laboratory System", by American Leistritz Extruder Corp. (undated).
U.S. Patent Application Serial No. 08/126,319, filed Sep. 24, 1993 entitled "Continuous Chewing Gum Base Manufacturing Process Using Highly Distributive Mixing", Inventors Song, et al.
U.S. Patent Application Serial No. 08/136,589, filed Oct. 14, 1993, entitled "Continuous Chewing Gum Base Manufacturing Process Using A Mixing–Restriction Element", Inventors Song, et al.
U.S. Patent Application Serial No. 08/141,281, filed Oct. 22, 1993, entitled "Continuous Gum Base Manufacture Using Paddle Mixing", Inventors Song, et al.
U.S. Patent Application Serial No. 08/305,363, filed Sep. 13, 1994 entitled "Total Chewing Gum Manufacture Using High Efficiency Continuous Mixing", Inventors Song, et al.
J. Agric. Food Chem. 1991, 39, 1063–1069, "Thermal Decomposition Of Some Phenolic Antioxidants", by (Hamama).
Ingredients Extra, Jun. 1994, vol. 7, No. 2 Supplement, "Extrusion Technology For Chewing Gum Production", by (Haarman & Reimer, The Netherlands).
"Buss Kneading Extruder Technology for the Food Industry", Advertising brochure by Buss America Inc. (date unknown).
Buss, Nov. 87, "Extrusion Processing Of Shear–Sensitive Food Products", by Dr. Treiber of Buss AG (Switzerland).
"Buss Extrusion Technology", Advertising brochure by Buss America Inc. (date unknown).

CONTINUOUS CHEWING GUM MANUFACTURE FROM BASE CONCENTRATE

RELATED APPLICATIONS

This application is a continuation of application Ser. No. 08/361,759, filed Dec. 22, 1994 abandoned, which is a continuation-in-part of U.S. application Ser. No. 08/305,363, filed on Sep. 13, 1994, now abandoned, the entire disclosure of which is incorporated herein by reference.

FIELD OF THE INVENTION

The present invention is a continuous method for making chewing gum, without separate manufacture of a chewing gum base, but using a gum base concentrate that contains some key gum base ingredients which may be common to a large number of gum bases.

BACKGROUND OF THE INVENTION

Conventionally, chewing gum base and chewing gum product have been manufactured using separate mixers, different mixing technologies and, often, different factories. One reason for this is that the optimum conditions for manufacturing gum base, and for manufacturing chewing gum from gum base and other ingredients such as sweeteners and flavors, are so different that it has been difficult to integrate both tasks. Gum base manufacture, on the one hand, involves dispersive (often high shear) mixing of difficult-to-blend ingredients such as elastomer, filler, elastomer plasticizer, base softeners/emulsifiers, and sometimes wax, and typically requires long mixing times. Chewing gum product manufacture, on the other hand, involves combining the gum base with more delicate ingredients such as product softeners, bulk sweeteners, high intensity sweeteners, and flavoring agents, using distributive (generally lower shear) mixing for shorter time periods.

As the number of chewing gum varieties has increased over time, the number of gum base varieties tailored for the various chewing gums has also increased. For instance, chewing gum products now vary in terms of sugar versus sugarless gum, standard tack versus non-tack or reduced tack gum, bubble gum versus regular (non-bubble) chewing gum, stick gum versus tab or pellet gum, and a wide variety of flavors and flavor combinations for each class of gum. The tailoring of gum bases, and the matching of gum bases to particular chewing gums, has become complex because different gum base formulations are preferred for different classes and flavors of chewing gum. The manufacturing of gum bases has also become complicated due to the large number of gum bases that must now be made.

In order to simplify gum base manufacture, gum base concentrates have been developed which contain less than all of the ingredients for a particular gum base, but which contain ingredients which may be common to a large number of gum bases. Statutory Inventory Registration H1241, issued to Synosky et al., discloses a gum base concentrate which contains about 15–25% synthetic elastomer, about 40–70% synthetic elastomer plasticizer including a terpene resin, about 10–25% wax, about 1–12% softener, and about 0–3% filler. French Patent Application 2,635,441 discloses a gum base concentrate containing up to 85% polymer in addition to mineral fillers and plasticizers. The polymer is a high molecular weight elastomer having a "numerical" molecular weight of at least 220,000 and a molecular weight "by weight" of at least 450,000.

U.S. Pat. No. 4,305,962, issued to Del Angel, discloses an elastomer/resin masterbatch formed by mixing a finely ground ester gum resin with a latex elastomer to form an emulsion, coagulating the emulsion using sodium chloride and sulfuric acid, separating the coagulated solid crumbs from the liquid phase, washing the solid crumbs, and removing the excess water.

U.S. Pat. No. 4,187,320, issued to Koch et al., discloses a two stage process for preparing a chewing gum base. In the first stage, a solid elastomer, an elastomer solvent, and an oleaginous plasticizer are combined and mixed together under high shear. In the second stage, a hydrophobic plasticizer, a non-toxic vinyl polymer, and an emulsifier are added to the mixture and mixed using high shear.

European Publication 0,273,809 discloses a gum base premix which includes at least one elastomer and at least one filler. The premix, which is made in a mill, is then divided into fragments, and combined with other gum base and/or chewing gum ingredients.

SUMMARY OF THE INVENTION

The present invention is a method of making chewing gum from a gum base concentrate by a two-stage process which does not require an intermediate base finishing stage and which does not require alteration of an existing or typical chewing gum formulation. A gum base concentrate is prepared by combining a high molecular weight elastomer with at least one of a lubricant and a filler, preferably both. Mixing of the gum base concentrate ingredients can be accomplished using any conventional gum base mixing process. Other gum base ingredients may also be included in the concentrate, but are not required at this stage. In order to have as many uses as possible, the composition of the gum base concentrate should be formulated to include ingredients which are common to a plurality of chewing gum products, preferably a large number of chewing gum products.

Then, the gum base concentrate is combined with any remaining gum base ingredients, and with other chewing gum ingredients, in a separate chewing gum mixing process. However, unlike previous efforts, the chewing gum mixing process is an efficient continuous process.

The continuous chewing gum mixing process is designed with the dual ability to a) combine the gum base concentrate with any remaining gum base ingredients and then b) combine the gum base with remaining chewing gum ingredients such as sweeteners, flavoring agents, chewing gum softeners, etc. A variety of continuous mixing extruders, and other continuous mixing processes, can be properly designed and retrofitted to perform these dual functions.

With the foregoing in mind, it is a feature and advantage of the invention to provide a gum base concentrate which can be used in a variety of different chewing gum products, thereby simplifying the gum base manufacturing, provided that a proper continuous procedure is followed for making the final chewing gum product.

It is also a feature and advantage of the invention to provide an improved two-stage process for making chewing gum, with the first stage being the manufacture of a gum base concentrate adaptable for use in a variety of different chewing gum products.

It is also a feature and advantage of the invention to provide an improved two-stage process for making chewing gum, in which the second stage provides continuous mixing for combining a gum base concentrate with remaining gum base ingredients and the remaining chewing gum ingredients.

It is also a feature and advantage of the invention to provide an improved continuous method for making chewing gum which utilizes a gum base concentrate adaptable for a variety of chewing gum products, and which integrates the finishing of the gum base manufacture with the manufacture of the final chewing gum product.

The foregoing and other features and advantages of the invention will become further apparent from the following detailed description of the presently preferred embodiments, read in conjunction with the accompanying examples. The detailed description and examples are intended to be merely illustrative rather than limiting, the scope of the invention being defined by the appended claims and equivalents thereof.

DETAILED DESCRIPTION OF THE PRESENTLY PREFERRED EMBODIMENTS

Figure 1:
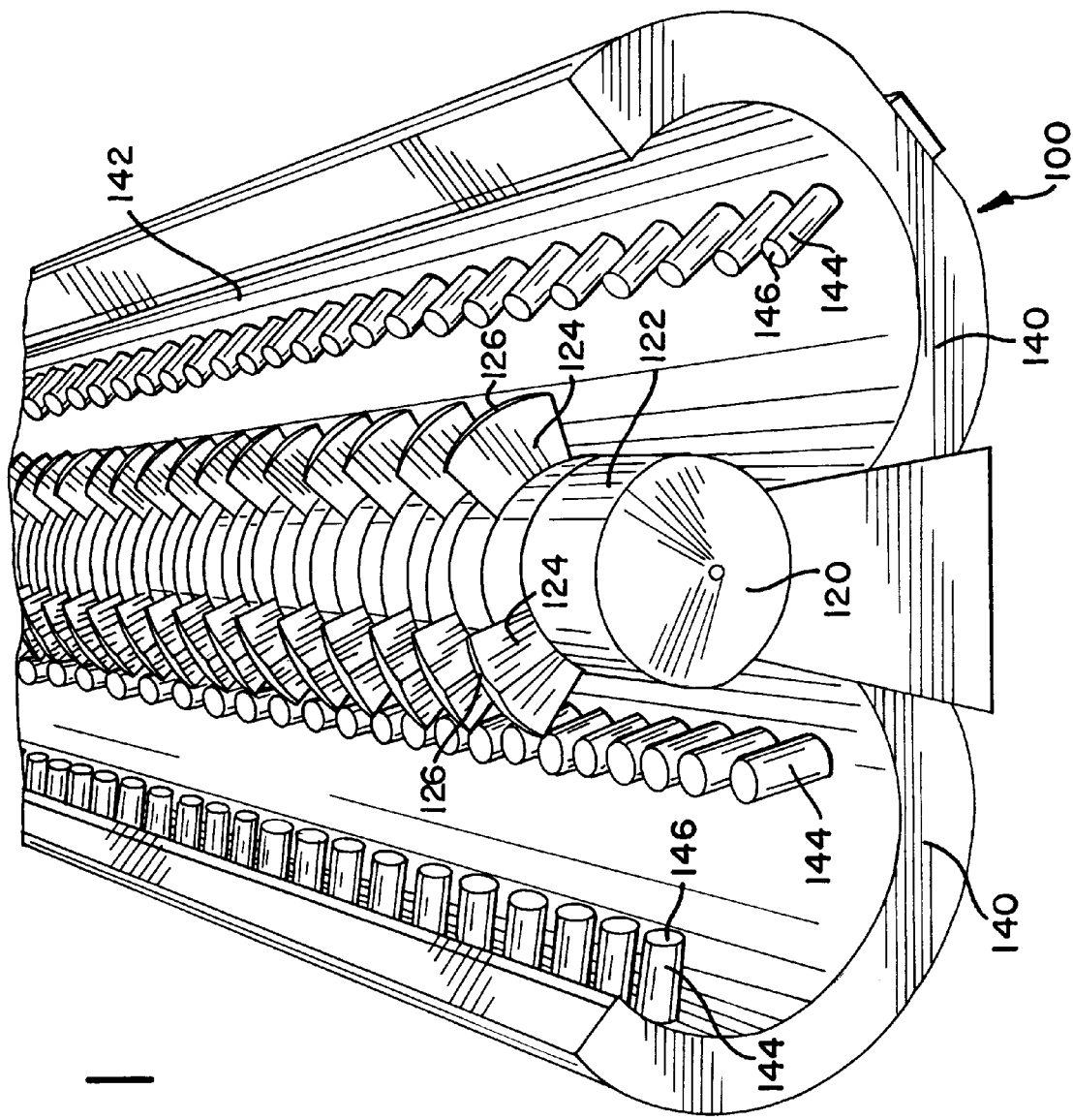
FIG. 1 is a partial exploded perspective view of a preferred Buss continuous high efficiency mixer used to practice the method of the invention, illustrating a mixing barrel and mixing screw arrangement.

For purposes of this invention, the phrase "gum base concentrate" is defined as any mixture of less than all gum base ingredients used for a particular chewing gum, and/or any mixture of gum base ingredients in which some ingredients are present in less than the amounts ultimately used for a particular chewing gum, subject to the proviso that the gum base concentrate includes most or all of the high molecular weight elastomer used in the gum base and at least some gum base lubricant, or filler, or both. The term "high molecular weight elastomer" refers to rubbers which give chewing gum desirable chewing characteristics but which are too hard to incorporate into the gum base (or gum base concentrate) without intensive dispersive mixing. These polymers include butyl rubber, styrene butadiene rubber, polyisoprene, and butadiene rubber, having weight average molecular weights in the range of 50,000 to 1,000,000, and more typically 100,000 to 200,000.

These same polymers may be used as "soft elastomers" when their weight average molecular weight is below 50,000 (typically 8,000 to 20,000). Such soft polymers may, but need not be included in the gum base concentrate, and may alternatively be mixed with the gum base concentrate and other gum base ingredients during the continuous chewing gum mixing stage, as explained below.

The gum base concentrate should be formulated with a composition that renders the concentrate useful in a variety of chewing gum bases and chewing gums. Complete chewing gum bases may include elastomers, elastomer plasticizers, waxes, fats, oils, softeners, emulsifiers, fillers, texturizers and miscellaneous ingredients such as antioxidants, preservatives, colorants and whiteners. The typical finished gum base constitutes between 5–95% by weight of the chewing gum composition, more typically 10–50% by weight of the chewing gum, and most commonly 20–30% by weight of the chewing gum.

Elastomers constitute about 5 to about 95 per cent by weight of the base, preferably between 10 and 70 per cent by weight and most preferably between 15 and 45 per cent by weight. Elastomers may include synthetic elastomers such as polyisobutylene, polybutadiene, isobutylene-isoprene copolymer, styrene-butadiene copolymer, polyvinyl acetate, vinyl acetate-vinyl laureate copolymer, polyethylene, ethylene vinyl acetate, polyvinyl alcohol or mixtures thereof. Elastomers may also include natural elastomers, including natural rubber such as smoked or liquid latex and guayule as well as natural gums such as jelutong, lechi caspi, perillo, massaranduba balata, massaranduba chocolate, nispero, rosindinha, chicle, gutta hang kang or mixtures thereof. Elastomers provide the rubbery, cohesive nature to the gum which varies depending on the elastomer's chemical and physical properties, and how the elastomer is blended with other ingredients. Synthetic elastomers are preferred for use with the present invention.

Elastomer plasticizers modify the finished gum firmness when used in the gum base. Elastomer plasticizers typically constitute from about 0 to about 75 per cent by weight of the gum base, preferably 5 to 45 per cent by weight and most preferably 10 to 30 per cent by weight. Elastomer plasticizers include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, methyl and partially hydrogenated methyl esters of rosin, pentaerythritol ester of rosin or mixtures. Elastomer plasticizers also include synthetics such as terpene resins derived from alpha-pinene, beta-pinene, dipentene or di-limonene, and combinations thereof.

Waxes include synthetic (e.g. polyethylene and Fischer-Tropsch waxes) and natural (candelilla carnauba, beeswax, rice bran or mixtures thereof) and petroleum (e.g. microcrystalline and paraffin). Waxes, when used, generally constitute up to 30 weight per cent of the gum base. When used, waxes aid in the curing of finished gum made from the gum base and also help improve the release of flavor, increase the shelf life and improve the chewing texture.

Fillers modify the texture of the gum base and aid processing. Fillers/texturizers include magnesium and calcium carbonate, ground limestone and silicate types such as magnesium and aluminum silicate, clay, alumina, talc as well as titanium oxide, mono-, di- and tricalcium phosphate, cellulose polymers such as ethylcellulose and methylcellulose, wood, or mixtures thereof. The filler typically comprises about 1 to about 60 per cent by weight of the gum base. Gum bases which utilize acidic ingredients preferably contain a filler that is inert to acids, most preferably talc.

Softeners and emulsifiers modify the texture and cause the hydrophobic and hydrophilic components of the gum base and chewing gum to become more miscible. Softeners/emulsifiers include tallow, hydrogenated tallow, lard, hydrogenated and partially hydrogenated vegetable oils, cocoa butter, glycerol monostearate, glycerol triacetate, lecithin, mono-, di- and triglycerides, acetylated mono-, di- and triglycerides, distilled mono-, di- and triglycerides, and fatty acids (e.g. stearic, palmitic, oleic, linoleic and linolenic acids) or mixtures thereof. Softeners/emulsifiers generally constitute between 0.5 and 40 weight per cent of the gum base.

Antioxidants prolong shelf life and storage of the gum base, finished gum and/or their respective components including fat and flavor oils. Antioxidants may include butylated hydroxyanisole (BHA), butylated hydroxytoluene (BHT), beta-carotenes, tocopherols, acidulants such as Vitamin C, propyl gallate or mixtures thereof.

Colorants and whiteners impart desired color characteristics or remove undesired color by whitening of the base and/or chewing gum. Colorants and whiteners include FD & C type lakes, plant extracts, fruit and vegetable extracts, titanium dioxide or mixtures thereof.

The gum base concentrate is formulated using less than all of the gum base ingredients, and/or using lesser quantities of some of the gum base ingredients than are ultimately present in the gum base and chewing gum. The gum base concentrate includes a high molecular weight elastomer component which may contain one or more of the elastomers listed above.

The gum base concentrate also contains a lubricant or a filler, or both. A lubricant is any ingredient which reduces friction in the mixing process. The lubricant can be a) any of the softener/emulsifiers mentioned above, b) any of the elastomer plasticizers mentioned above, c) a low molecular weight ("soft") elastomer, or d) any combination of the foregoing. The filler may be any of the fillers mentioned above, or a combination thereof.

The composition of the base concentrate may vary widely depending on the intended composition of the chewing gum product(s) in which it will be used, the equipment used in processing and other factors specific to the actual manufacturing operation. However, it will preferably contain all of the hard (high molecular weight) elastomer to be used in the finished gum composition and sufficient additional base ingredients (lubricant and/or filler) to allow efficient dispersive mixing.

The lubricant and/or filler levels will be carefully chosen to facilitate mixing. The lubricant reduces friction and shearing force to prevent overloading the mixer motor and other components. The filler increases friction and shearing to ensure adequate dispersive mixing of the hard elastomer. These functions are at odds with one another and, therefore, it is important to carefully select their levels and ratio to optimize the mixing operation.

In general, the concentrate will contain 5 to 60% elastomer (preferably 8–40%), 0 to 90% lubricant (preferably 40–80%), 0 to 60% filler (preferably 5 to 40%) and 0 to 20% other base ingredients (preferably 0 to 10%). Of the total elastomer in the gum base concentrate, at least 20% (preferably at least 30%) is hard (high molecular weight) elastomer.

Preferably, the gum base concentrate includes at least some elastomer, lubricant and filler. The gum base concentrate may also include one or more additional gum base ingredients, as described above, provided that the inclusion of such ingredient does not eliminate the advantage of the gum base concentrate having a composition which is useful in a variety of different gum bases and chewing gums. In other words, the gum base concentrate should be composed of ingredients that are common to different gum bases. Preferably, the gum base concentrate will include some or all of the desired fats and oils, because these may be more difficult to add and mix later on.

The gum base concentrate can be prepared using any conventional high shear/high dispersion batch mixer which is typically used to manufacture a complete gum base. A continuous mixer or compounder may also be used as long as the mixer provides adequate dispersive mixing to effectively blend the ingredients. One suitable conventional mixer is a sigma blade mixer having a front to rear blade speed ratio of about 2:1, as described Statutory Invention Registration H1241, issued to synosky et al. One suitable continuous mixer for the gum base concentrate is a paddle mixer as described in U.S. Pat. No. 5,419,919. Other continuous mixers include a blade-and-pin mixer, a corotating twin screw extruder, a counterrotating twin screw extruder, or a single screw extruder, provided that the mixer is capable of being configured and run in a manner which yields a homogeneous gum base concentrate.

An initial portion of elastomer, lubricant and/or filler can be added to a heated sigma blade mixer and blended homogeneously. Then the remainder of these ingredients, and other gum base ingredients (if included), may be added sequentially and blended until a homogeneous mass is attained. This can usually be achieved in about one to f our hours, depending on the exact composition of the gum base concentrate. The final mass temperature can be about 60–150° C., preferably about 80–120° C. The completely mixed molten mass can be emptied from the mixer into coated or lined pans, extruded or cast into any desirable shape, and allowed to cool or solidify. Alternatively, the molten gum base concentrate can be fed directly into the continuous chewing gum mixing operation if the gum base concentrate mixing equipment and continuous chewing gun mixing equipment are located at the same facility.

The gum base concentrate is added to a continuous mixing apparatus which is configured for adding and mixing both the remaining gum base ingredients and the remaining chewing gum ingredients. The continuous mixer may be a properly configured twin screw extruder (with corotating or counterrotating screws), paddle mixer, blade-and-pin mixer, single screw extruder, or another continuous mixing apparatus. One particularly suitable continuous mixer is a high efficiency blade-and-pin mixer, described in the parent U.S. application Ser. No. 08/305,363, the disclosure of which has been incorporated herein by reference. Another well-suited continuous mixer is a corotating twin-screw extrusion mixer, such as a Werner-Pfleiderer ZSK-58 available from Werner-Pfleiderer Corp. of Ramsey, N.J.

The continuous mixer typically includes a plurality of mixing zones located a) at or near the upstream end of the mixer, b) at or near the center of the mixer, and c) at or near the downstream (exit) end of the mixer. For instance, the blade-and-pin mixer described in the above-identified parent application includes five mixing zones. Different ingredients are continuously fed into different zones of the continuous mixer. Once in the mixer, the ingredients are simultaneously blended with other ingredients and fed downstream toward the exit of the mixer.

In accordance with the invention, the gum base concentrate is preferably fed into the upstream zone of the continuous mixer, for example, the first zone of a five-zone blade-and-pin mixer. In order to accomplish continuous feeding of the gum base concentrate, the concentrate may be fed in a molten or liquified form from a heated tank. Alternatively, the gum base concentrate may be ground and fed as solid pellets.

The upstream zones of the mixer, for example, the first two or three zones of a five-zone blade-and-pin mixer, may be configured for high efficiency dispersive mixing. However, this is not absolutely essential for the present invention, and less intensive distributive mixing may also be employed. The remaining gum base ingredients, which have not been included or which have been only partially included in the gum base concentrate, are added into the first mixing zone, downstream from the addition of the concentrate. These remaining gum base ingredients may include softeners, elastomer solvents, resins, additional fillers, colors, antioxidants, and low molecular weight elastomers. As the concentrate and other gum base ingredients are conveyed downstream, the ingredients become mixed to form a substantially homogeneous molten gum base within about the first 50–70 percent of the mixer length, or by about the end of the third mixing zone of a five-zone blade-and-pin mixer.

The mixing zones at or near the downstream end of the continuous mixer, such as the fourth and fifth mixing zones of a five-zone blade-and-pin mixer, are configured for distributive mixing. Distributive mixing is gentler than dispersive mixing, involves less shear, generates less heat, and is easier on the ingredients being mixed. The remaining (non-base) chewing gum ingredients are added and mixed with the molten gum base in the distributive mixing zone or zones.

The gum base, which is generally water-insoluble, constitutes about 5–95% by weight of the chewing gum product, more typically about 10–50% by weight of the chewing gum, most commonly about 20–30% by weight of the chewing gum. In addition to the gum base, the chewing gum includes a generally water-soluble portion which may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

U.S. application Ser. No. 08/305,363, which has been incorporated herein by reference, discloses using a high efficiency continuous mixer (for example, a blade-and-pin mixer) to make chewing gum without requiring separate manufacture of a gum base. Except for the separate manufacture of a gum base concentrate, as taught herein, procedures similar to those set forth in the above-identified parent application can be used to make chewing gum according to this invention. As explained in the parent application, a mixing distance, or L/D, can be expressed as a ratio of the length of a particular active region of mixer screw, which is composed of mixing elements, divided by the maximum diameter of the mixer barrel in this active region. The method of the invention comprises performing the following mixing steps in a single continuous mixer:

a) adding and thoroughly mixing at least a portion of the gum base concentrate and other gum base ingredients in the continuous mixer, using an L/D of not more than about 25;

b) adding at least a portion of the remaining (non-base) chewing gum ingredients, and thoroughly mixing these ingredients with the gum base ingredients in the same mixer, using an L/D of not more than about 25; and c) sufficiently completing the entire addition and mixing operation in the same mixer, so that the ingredients exist as a substantially homogenous chewing gum mass, using a total L/D of not more than about 40.

It is preferred that the gum base concentrate and other gum base ingredients be completely added and mixed upstream from the remaining chewing gum ingredients, and that the remaining ingredients be completely added downstream for mixing with the already blended gum base. However, the invention also encompasses variations of this procedure wherein a portion of gum base ingredients may be added downstream with or after some remaining chewing gum ingredients, and/or wherein a portion of the remaining (non-base) ingredients may be added upstream with or before some of the base ingredients. The important feature is that a substantially homogeneous chewing gum product mass may be formed in a single continuous mixer, using an L/D of not more than about 40, without requiring separate manufacture of a gum base except for the gum base concentrate.

As further explained in the parent application, Ser. No. 08/305,363, the gum base manufacture can be completed using a mixing L/D of about 25 or less, preferably about 20 or less, most preferably about 15 or less. Then, in accordance with the invention, the remaining chewing gum ingredients can be combined with the gum base to make a finished chewing gum product using a mixing L/D of about 25 or less, preferably about 15 or less, most preferably about 10 or less. The mixing of the gum base ingredients and the remaining chewing gum ingredients preferably occur in different parts of the mixer, but may overlap, so long as the total mixing is achieved using an L/D of about 40 or less, preferably about 30 or less, most preferably about 20 or less.

When a preferred blade-and-pin mixer is used as the continuous mixer, the chewing gum manufacture can be completed using a total mixing L/D of about 19. The gum base concentrate can be added and mixed with the remaining gum base ingredients using an L/D of about 15 or less, and the remaining chewing gum ingredients can be combined with the gum base ingredients using a further L/D of about 5 or less.

A blade-and-pin mixer is exemplified in FIG. 1. A blade-and-pin mixer uses a combination of selectively configured rotating mixer blades and stationary barrel pins to provide efficient mixing over a relatively short distance. A commercially available blade-and-pin mixer is the Buss kneader, manufactured by Buss AG in Switzerland, and available from Buss America, located in Bloomingdale, Ill.

Referring to FIG. 1, a presently preferred blade-and-pin mixer 100 includes a single mixing screw 120 turning inside a barrel 140 which, during use, is closed and completely surrounds the mixing screw 120. The mixing screw 120 includes a generally cylindrical shaft 122 and three rows of mixing blades 124 arranged at evenly spaced locations around the screw shaft 122 (with only two of the rows being visible in FIG. 1). The mixing blades 124 protrude radially outward from the shaft 122, with each one resembling the blade of an axe.

The mixing barrel 140 includes an inner barrel shaft 142 which is generally cylindrical when the barrel 140 is closed around the screw 120 during operation of the mixer 100. Three rows of stationary pins 144 are arranged at evenly spaced locations around the barrel shaft 142, and protrude radially inward from the barrel shaft 142. The pins 144 are generally cylindrical in shape, and may have rounded or bevelled ends 146.

The mixing screw 120 with blades 124 rotates inside the barrel 140 and is driven by a variable speed motor (not shown). During rotation, the mixing screw 120 also moves back and forth in an axial direction, creating a combination of rotational and axial mixing which is highly efficient. During mixing, the mixing blades 124 continually pass between the stationary pins 144, yet the blades and the pins never touch each other. Also, the radial edges 126 of the blades 124 never touch the barrel inner surface 142, and the ends 146 of the pins 144 never touch the mixing screw shaft 122.

FIGS. 2–6 illustrate various screw elements which can be used to configure the mixing screw 120 for optimum use. FIGS. 2A and 2B illustrate on-screw elements 20 and 21 which are used in conjunction with a restriction ring assembly. The on-screw elements 20 and 21 each include a cylindrical outer surface 22, a plurality of blades 24 projecting outward from the surface 22, and an inner opening 26 with a keyway 28 for receiving and engaging a mixing screw shaft (not shown). The second on-screw element 21 is about twice as long as the first on-screw element 20.

Figure 2A:
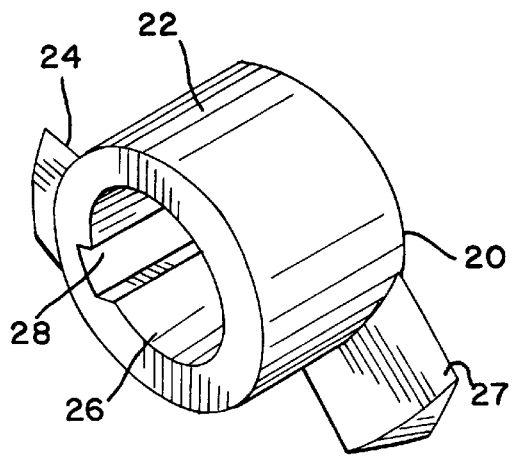
FIG. 2A is a perspective view of an on-screw element used on the upstream side of a restriction ring assembly, in the presently preferred high efficiency mixer configuration.
Figure 2B:
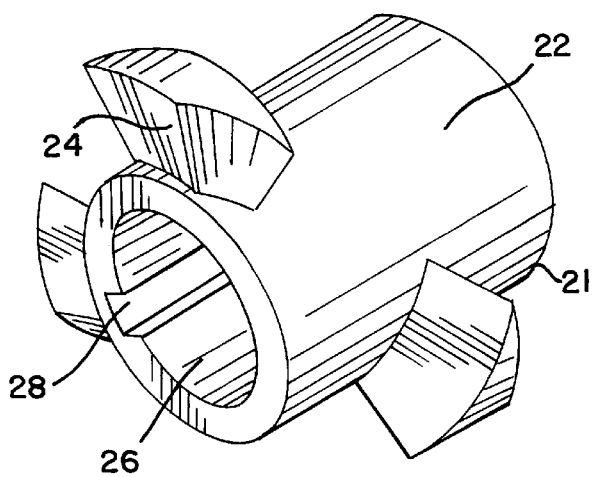
FIG. 2B is a perspective view of an on-screw element used on the downstream side of a restriction ring assembly, in the presently preferred high efficiency mixer configuration.
Figure 2C:
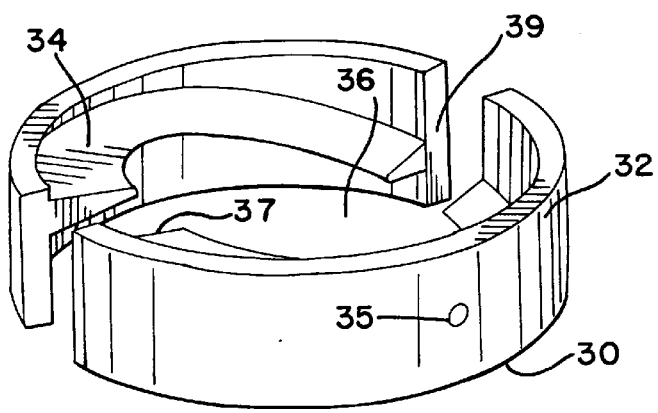
FIG. 2C is a perspective view of a restriction ring assembly used in the presently preferred high efficiency mixer configuration.

FIG. 2C illustrates a restriction ring assembly 30 used to build back pressure at selected locations along the mixing screw 120. The restriction ring assembly 30 includes two halves 37 and 39 mounted to the barrel housing 142, which halves engage during use to form a closed ring. The restriction ring assembly 30 includes a circular outer rim 32, an inner ring 34 angled as shown, and an opening 36 in the inner ring which receives, but does not touch, the on-screw elements 20 and 21 mounted to the screw shaft. Mounting openings 35 in the surface 32 of both halves of the restriction ring assembly 30 are used to mount the halves to the barrel housing 142.

Figure 3:
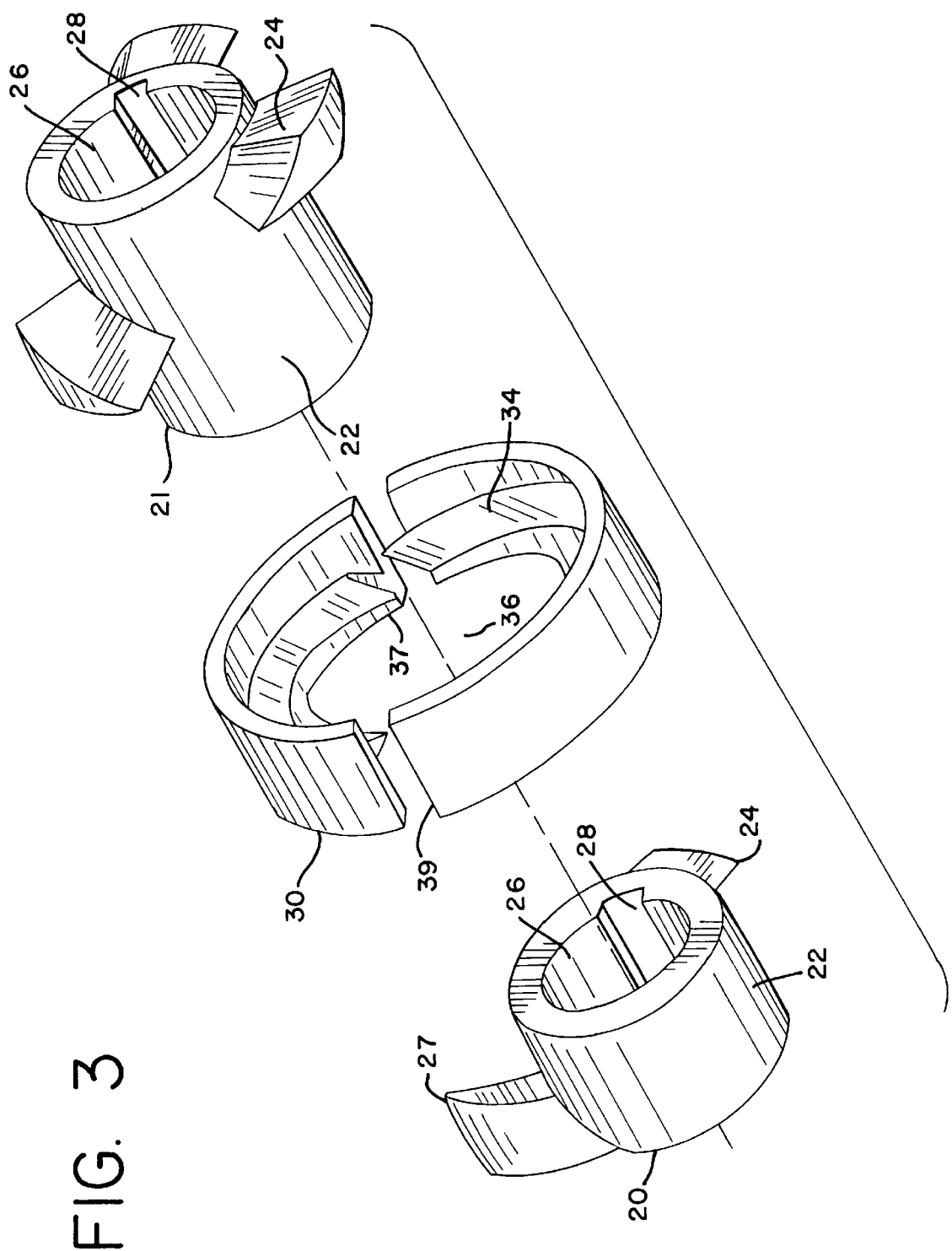
FIG. 3 is a perspective view showing the relative positioning of the elements of FIGS. 2A, 2B and 2C in the presently preferred high efficiency mixer configuration.

FIG. 3 illustrates the relationship between the restriction ring assembly 30 and the on-screw elements 20 and 21 during operation. When the mixing screw 120 is turning inside the barrel 140, and reciprocating axially, the clearances between the on-screw elements 20 and 21 and the inner ring 34 provide the primary means of passage of material from one side of the restriction ring assembly 30 to the other. The on-screw element 20 on the upstream side of the restriction ring assembly includes a modified blade 27 permitting clearance of the inner ring 34. The other on-screw element 21 is placed generally downstream of the restriction element 30, and has an end blade (not visible) which moves close to and wipes the opposite surface of the inner ring 34.

The clearances between outer surfaces 22 of the on-screw elements 20 and 21 and the inner ring 34 of the restriction ring assembly 30, which can vary and preferably are on the order of 1–5 mm, determine to a large extent how much pressure build-up will occur in the upstream region of the restriction ring assembly 30 during operation of the mixer 100. It should be noted that the upstream on-screw element 20 has an L/D of about 1/3, and the downstream on-screw element 21 has an L/D of about 2/3, resulting in a total L/D of about 1.0 for the on-screw elements. The restriction ring assembly 30 has a smaller L/D of about 0.45 which coincides with the L/D of on-screw elements 20 and 21, which engage each other but do not touch the restriction ring assembly.

Figure 4:
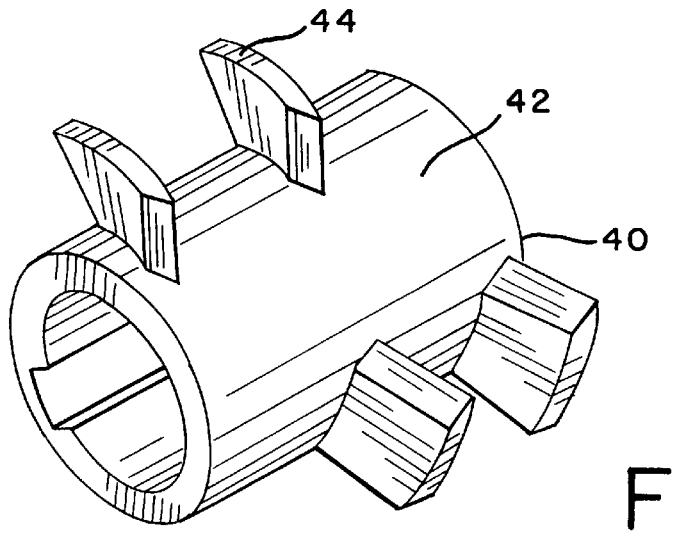
FIG. 4 is a perspective view of a low-shear mixing screw element used in the presently preferred high efficiency mixer configuration.
Figure 5:
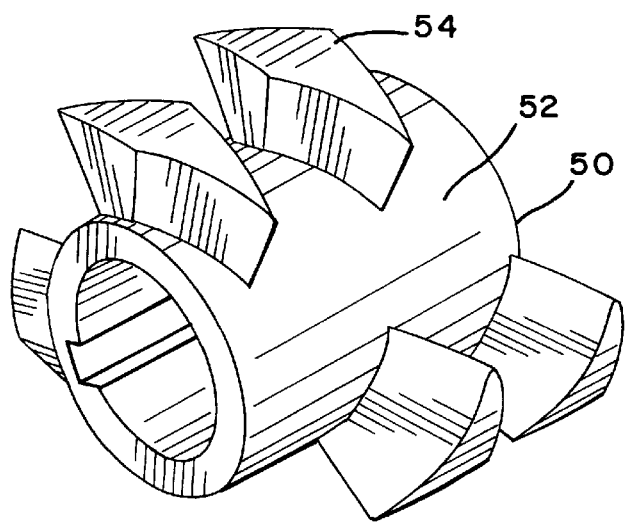
FIG. 5 is a perspective view of a high-shear mixing screw element used in the presently preferred high efficiency mixer configuration.

FIGS. 4 and 5 illustrate the mixing or "kneading" elements which perform most of the mixing work. The primary difference between the lower shear mixing element 40 of FIG. 4 and the higher shear mixing element 50 of FIG. 5 is the size of the mixing blades which project outward on the mixing elements. In FIG. 5, the higher shear mixing blades 54 which project outward from the surface 52 are larger and thicker than the lower shear mixing blades 44 projecting outward from the surface 42 in FIG. 4. For each of the mixing elements 40 and 50, the mixing blades are arranged in three circumferentially-spaced rows, as explained above with respect to FIG. 1. The use of thicker mixing blades 54 in FIG. 5 means that there is less axial distance between the blades and also less clearance between the blades 54 and the stationary pins 144 as the screw 120 rotates and reciprocates axially (FIG. 1). This reduction in clearance causes inherently higher shear in the vicinity of the mixing elements 50.

Figure 6:
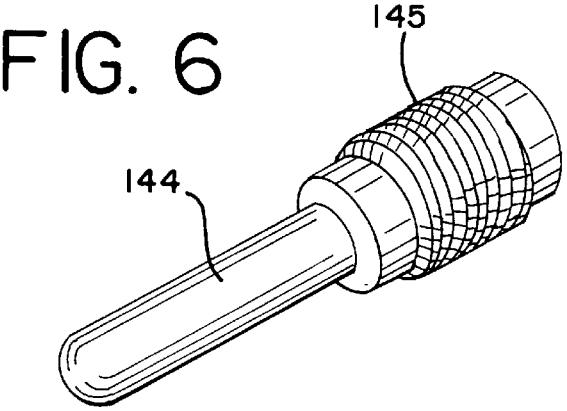
FIG. 6 is a perspective view of a barrel pin element used in the presently preferred high efficiency mixer configuration.

FIG. 6 illustrates a single stationary pin 144 detached from the barrel 140. The pin 144 includes a threaded base 145 which permits attachment at selected locations along the inner barrel shaft 142. It is also possible to configure some of the pins 144 as liquid injection ports by providing them with hollow center openings.

Figure 7:
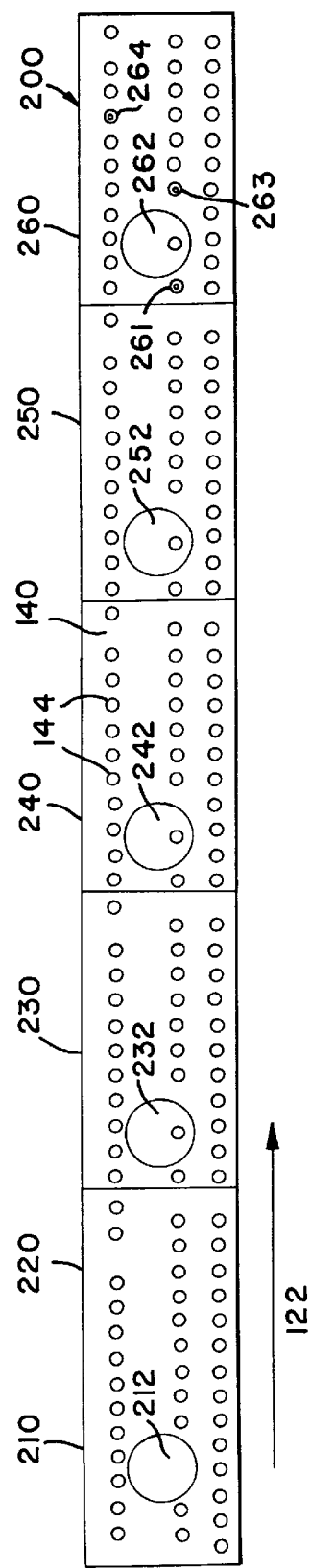
FIG. 7 is a schematic diagram of a presently preferred arrangement of mixing barrel pins and ingredient feed ports used to practice the method of the invention.
Figure 8:
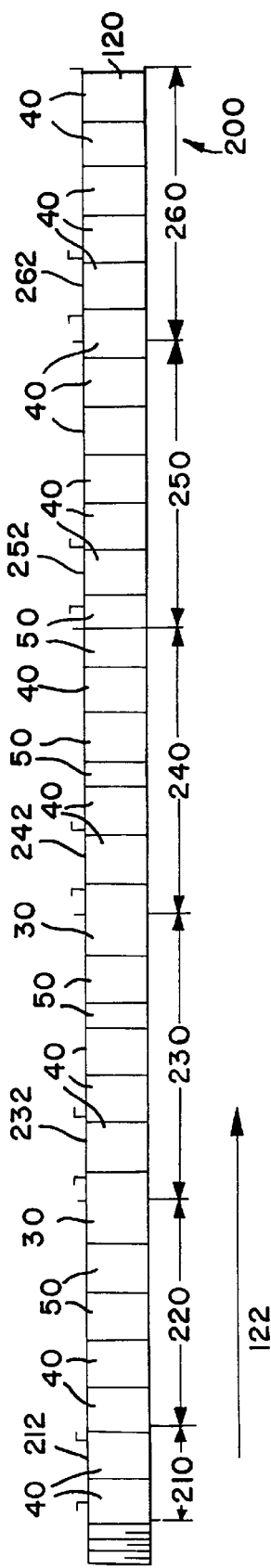
FIG. 8 is a schematic diagram of a presently preferred mixing screw configuration used to practice the method of the invention.

FIG. 7 is a schematic view showing the presently preferred barrel configuration, including the presently preferred arrangement of barrel pins 144. FIG. 8 is a corresponding schematic view illustrating the presently preferred mixing screw configuration. The mixer 200 whose preferred configuration is illustrated in FIGS. 7 and 8 has an overall active mixing L/D of about 19.

The mixer 200 includes an initial feed zone 210 and five mixing zones 220, 230, 240, 250 and 260. The zones 210, 230, 240, 250 and 260 include five possible large feed ports 212, 232, 242, 252 and 262, respectively, which can be used to add major (e.g. solid) ingredients to the mixer 200. The zone 260 is also configured with three smaller liquid injection ports 261, 263 and 264 which can be used to add liquid ingredients. The liquid injection ports 261, 263 and 264 include special barrel pins 144 formed with hollow centers, as explained above.

Referring to FIG. 7, barrel pins 144 are preferably present in most or all of the available locations, in all three rows as shown.

Referring to FIG. 8, the presently preferred configuration of the mixing screw 120 for most chewing gum products is schematically illustrated as follows. Zone 210, which is the initial feed zone, is configured with about 1⅓ L/D of low shear elements, including two of the elements 40 shown in FIG. 4. The L/D of the initial feed zone 210 is not counted as part of the overall active mixing L/D of 19, discussed above, because its purpose is merely to convey ingredients into the mixing zones.

The first mixing zone 220 is configured, from left to right (FIG. 8), with two low shear mixing elements 40 (FIG. 4) followed by two high shear elements 50 (FIG. 5). The two low shear mixing elements contribute about 1⅓ L/D of mixing, and the two high shear mixing elements contribute about 1⅓ L/D of mixing. Zone 220 has a total mixing L/D of about 3.0, including the end part covered by a 57 mm restriction ring assembly 30 with cooperating on-screw elements 20 and 21 (not separately designated in FIG. 8).

The restriction ring assembly 30 with cooperating on-screw elements 20 and 21, straddling the end of the first mixing zone 220 and the start of the second mixing zone 230 have a combined L/D of about 1.0, part of which is in the second mixing zone 230. Then, zone 230 is configured, from left to right, with three low shear mixing elements 40 and 1.5 high shear mixing elements 50. The three low shear mixing elements contribute about 2.0 L/D of mixing, and the 1.5 high shear mixing elements contribute about 1.0 L/D of mixing. Zone 230 has a total mixing L/D of about 4.0.

Straddling the end of the second mixing zone 230 and the start of the third mixing zone 240 are a 60 mm restriction ring assembly 30 with cooperating on-screw elements having a combined L/D of about 1.0. Then, zone 240 is configured, from left to right, with two low shear mixing elements 40 contributing a mixing L/D of about 1⅓, followed by 1.5 high shear mixing elements 50 contributing a mixing L/D of about 1.0, followed by one low shear mixing element 40 contributing a mixing L/D of about two thirds. Zone 240 also has a total mixing L/D of about 4.0.

Straddling the end of the third mixing zone 240 and the start of the fourth mixing zone 250 are 1.5 high shear mixing elements 50 contributing a mixing L/D of about 1.0. Then, the remainder of the fourth mixing zone 250 and the fifth mixing zone 260 are configured with eleven low shear mixing elements contributing a mixing L/D of about 7⅓. Zone 250 has a total mixing L/D of about 4.0, and zone 260 has a total mixing L/D of about 4.0.

In order to accomplish the chewing gum manufacture using the preferred blade-and-pin mixer 200, it is advantageous to maintain the rpm of the mixing screw 120 at less than about 150, preferably less than about 100. Also, the mixer temperature is preferably optimized so that the gum base is at about 130° F. or lower when it initially meets the other chewing gum ingredients, and the chewing gum product is at about 130° F. or lower (preferably 125° F. or lower) when it exits the mixer. This temperature optimization can be accomplished, in part, by selectively heating and/or water cooling the barrel sections surrounding the mixing zones 220, 230, 240, 250 and 260.

In order to manufacture the gum base, the following preferred procedure can be followed. The gum base concentrate and any remaining gum base ingredients are added to the first large feed port 212 in the feed zone 210 of the mixer 200, and are subjected to dispersive mixing in the first mixing zone 220 and the second mixing zone 230 while being conveyed in the direction of the arrow 122. Then, the gum base ingredients are subjected to more distributive mixing in the third mixing zone 240, while being conveyed in the direction of arrow 122. By the time the ingredients leave the zone 240, the gum base manufacture should be complete. The gum base should leave the third mixing zone 240 as a substantially homogeneous, lump-free compound with a uniform color. Of course, the gum base could only be observed by stopping the mixer and opening the mixer barrel.

The fourth mixing zone 250 is used primarily to cool the gum base, although minor chewing gum ingredients may be added here. Then, to manufacture the final chewing gum product, glycerin, corn syrup, other bulk sugar sweeteners, high intensity sweeteners, and flavors can be added to the fifth mixing zone 260, and the ingredients are subjected to distributive mixing. If the gum product is to be sugarless, hydrogenated starch hydrolysate or sorbitol solution can be substituted for the corn syrup and powdered alditols can be substituted for the sugars.

Preferably, glycerin is added to the first liquid injection port 261 in the fifth mixing zone 260. Solid ingredients (bulk sweeteners, encapsulated high intensity sweeteners, etc.) are added to the large feed port 262. Syrups (corn syrup, hydrogenated starch hydrolyzate, sorbitol solution, etc.) are added to the next liquid injection port 263, and flavors are added to the final liquid injection port 264. Flavors can alternatively be added at ports 261 and 263 in order to help plasticize the gum base, thereby reducing the temperature and torque on the screw. This may permit running of the mixer at higher rpm and throughput.

The gum ingredients are compounded to a homogeneous mass which is discharged from the mixer as a continuous stream or "rope". The continuous stream or rope can be deposited onto a moving conveyor and carried to a forming station, where the gum is shaped into the desired form such as by rolling it into sheets, scoring, and cutting into sticks.

A wide range of changes and modifications to the preferred embodiments of the invention will be apparent to persons skilled in the art. The above preferred embodiments, and the examples which follow, are merely illustrative of the invention and should not be construed as imposing limitations on the invention. For instance, different continuous mixing equipment and different mixer configurations can be used without departing from the invention as long as the completion of a chewing gum base and chewing gum product are accomplished in a single continuous mixer using a mixing L/D of less than about 40.

EXAMPLE 1

The following gum base concentrate was prepared using techniques similar to conventional techniques for making a gum base. Specifically, a high shear W & P dual blade sigma mixer was used having a front blade speed of 252 rpm, heated with 45 psi steam, and having a 750-lb batch size. A two-hour mixing cycle was used, and the batch was discharged at 95–120° C.

| GUM BASE CONCENTRATE INGREDIENT | PERCENT BY WEIGHT OF GUM BASE CONCENTRATE |
|---|---|
| Butyl Rubber (Mol. Wt. = 135,000) | 16.78 |
| Calcium Carbonate | 8.22 |
| Glycerol Monostearate | 9.59 |
| Hydrogenated Soybean Oil | 9.07 |
| Partially Hydrogenated Vegetable Shortening | 6.39 |
| Hydrogenated Cottonseed Oil | 15.45 |
| Polyisobutylene (Mol. Wt. = 10,000) | 11.72 |
| Cocoa Powder | 1.20 |
| Terpene Resin | 21.53 |
| BHT | 0.05 |
| Total | 100.0 |

The above gum base concentrate had a homogeneous consistency, and a composition suitable for use in a variety of chewing gum products.

EXAMPLE 2

A chewing gum product was made using a Buss blade-and-pin mixer having five mixing barrel zones, a mixing L/D of about 19, and an additional feed conveying L/D of about 1⅓ before the first mixing zone. The mixer had a maximum barrel diameter of 100 mm and a screw length of 2080 mm. The mixing screw was designed using the preferred configuration described above with respect to FIGS. 7 and 8. The feed rates were designed to yield about 300 pounds per hour of chewing gum product. No die was used at the downstream end of the mixer, and the product exited as a continuous rope.

Liquid ingredients were fed using volumetric pumps into the large feed ports and/or smaller liquid injection ports generally positioned as described above, unless otherwise indicated. The pumps were appropriately sized and adjusted to achieve the desired feed rates.

Dry ingredients were added using gravimetric screw feeders into the large feed ports positioned as described above. Again, the feeders were appropriately sized and adjusted to achieve the desired feed rates.

Temperature control was accomplished by circulating water through jackets surrounding each mixing barrel zone and inside the mixing screw, as needed. Where water cooling was desired, tap water (typically at about 55° F.) was used without additional chilling.

Temperatures were recorded for both the fluid and the ingredient mixture. Fluid (water) temperatures were set for each barrel mixing zone (corresponding to zones 220, 230, 240, 250 and 260 in FIGS. 7 and 8), and are reported below as Z1, Z2, Z3, Z4 and Z5, respectively. Fluid temperatures were also set for the mixing screw 120, and are reported below as S1.

Actual mixture temperatures were recorded near the downstream end of mixing zones 220, 230, 240 and 250; near the middle of mixing zone 260; and near the end of mixing zone 260. These mixture temperatures are reported below as T1, T2, T3, T4, T5 and T6, respectively. Actual mixture temperatures are influenced by the temperatures of the circulating fluid, the heat exchange properties of the mixture and surrounding barrel, and the mechanical heating from the mixing process, and often differ from the set temperatures due to the additional factors.

All ingredients were added to the continuous mixer at ambient temperature (about 77° F.) unless otherwise noted.

Referring to FIGS. 7 and 8, the gum base concentrate of Example 1 was fed as pellets into the large feed port 212 of the initial feed zone 210, at a continuous rate of 31.1 pounds per hour. Also fed into the port 212 were calcium carbonate at 10.4 pounds per hour, terpene resin at 3.65 pounds per hour, high molecular weight polyvinyl acetate (Average Mol. Wt.=65,000) at 1.65 pounds per hour, and low molecular weight polyvinyl acetate (Average Mol. Wt.=25,000) at 13.2 pounds per hour. These ingredients were mixed together and conveyed in the direction of arrow 122 (FIG. 8). The gum base concentrate comprised about 51.8% of the total gum base.

No further ingredients were added into the mixing zones 220 through 250. Glycerin was injected at 4.50 pounds per hour into the first liquid injection port 261 of the fifth mixing zone 260. Sugar was added at 193.5 pounds per hour into the large feed port 262 of the mixing zone 260. Corn syrup (at 40° C.) was injected at 39.0 pounds per hour into the second liquid injection port 263 of the mixing zone 260. Finally, peppermint oil was injected at 3.00 pounds per hour into the third liquid injection port 264 of the mixing zone 260.

The ingredients were mixed together and conveyed downstream using a mixing screw speed of 60 rpm. The zone temperatures (Z1–Z5, °F.) were set at 150, 150, 100, 55 and 55, respectively. The screw temperature (S1) was set at 55° F. The mixture temperatures (T1–T6, °F.) were measured as 150, 153, 128, 87, 95, and 103, respectively.

The chewing gum product exited the mixer at 117° F. and was judged to be of acceptable quality.

EXAMPLE 3

The following is an example of a different chewing gum product that can be made using the same gum base concentrate of Example 1. This chewing gum formulation, which is fruit-flavored, would also include a different ultimate gum base composition than the chewing gum of Example 2.

The blade-and-pin mixer can be set up and run as in Example 2 except that the following ingredients and feed rates would be used:

| INGREDIENT | ADDITION PORT (FIG. 7) | FEED RATE (LBS PER HOUR) |
|---|---|---|
| Base Concentrate (Example 1) | 212 | 35.0 |
| Calcium Carbonate | 212 | 3.43 |
| Polyvinyl Acetate | 212 | 11.7 |

-continued

| INGREDIENT | ADDITION PORT (FIG. 7) | FEED RATE (LBS PER HOUR) |
|---|---|---|
| (Mol. Wt. = 25,000) | | |
| Terpene Resin | 212 | 7.77 |
| Glycerin | 261 | 3.45 |
| Sugar | 262 | 172.7 |
| Dextrose Monohydrate | 262 | 21.8 |
| Corn Syrup (40° C.) | 263 | 41.7 |
| Fruit Flavor | 264 | 2.45 |

The gum base concentrate comprised about 60.4% of the total gum base.

Comparison of Examples 2 and 3 indicates that, when the method of the invention is employed, significantly different chewing gum compositions with significantly different gum bases can be made using the same gum base concentrate and very similar manufacturing techniques.

EXAMPLE 4

This Example illustrates the continuous preparation of a gum base concentrate using a paddle mixer as described in U.S. Pat. No. 5,419,919. Specifically, the paddle mixer can be a 5-inch paddle diameter Teledyne Readco continuous twin screw mixer, available from Teledyne Readco in York, Pa. The paddle mixer can be heated to 175° C. and run at 250 rpm.

As further explained in U.S. application Ser. No. 08/141, 281, a Teledyne Readco paddle mixer may include an initial twin feed screw positioned adjacent to a first ingredient addition port, followed by 28 segments on each screw shaft which are user configurable. Paddle elements may be placed on each segment in any of four axial positions numbered 1–4 (separated by relative angles of 0°, 90°, 180° and 270°) to generate forward, neutral or back pressure over a series of segments. For purposes of this Example, each of the twin screw shafts can be configured as follows:

a) Segments 1–11 (downstream from the initial twin screw feed section) configured with flat paddles in the following respective axial positions: 4, 4, 4, 2, 2, 2, 3, 4, 1, 2, 3;

b) Segments 12–15 configured with a second twin feed screw section, adjacent to a second ingredient addition port;

c) Segments 16–27 (downstream from the second twin screw feed section) configured with flat paddles in the following respective axial positions: 3, 3, 3, 1, 1, 1, 3, 3, 3, 4, 1, 2; and d) Segment 28 configured with a reverse helical element positional in axial position 1.

Into the first feed port can be added 14.12 lbs/hr of butyl rubber, 35.12 lb/hr of calcium carbonate, and 27.88 lbs/hr of terpene resin.

Into the second feed port can be added 42.88 lbs/hr of polyvinyl acetate.

The product will be 120 lbs/hr of homogeneous gum base concentrate which can be fed continuously, in molten form, into a continuous chewing gum mixer as described in Example 5.

EXAMPLE 5

This Example illustrates the continuous preparation of a wintergreen-flavored sugar chewing gum using the base concentrate of Example 4.

Two identical Werner-Pfleiderer ZSK 58 twin screw continuous mixing extruders can be placed in parallel with each other, and in series with the Teledyne Readco mixer used to make the gum base concentrate of Example 4. Each ZSK 58 is equipped with six 240 mm long, 58 mm diameter barrel segments or zones. As such, each barrel segment has a nominal L/D of 4 and each ZSK 58 has a nominal total mixer L/D of 24.

The continuous molten gum base concentrate stream exiting the paddle mixer is divided into two equal streams of 60 pounds per hour, with one stream feeding each of the ZSK 58 continuous mixers. Each continuous mixer is configured with a screw profile selected to provide sufficient distributive mixing in the first 3–4 barrel sections (12–16 L/D) in order to incorporate oils and polyisobutylene into the gum base concentrate, thereby providing a finished gum base. Thereafter, the remainder of each ZSK 58 mixer (2–3 barrel sections, or 8–12 L/D) is configured for distributive mixing to facilitate incorporation of the remaining (non-base) chewing gum ingredients.

Specifically, each of the twin mixing screws in each ZSK 58 mixer can be configured as follows. The first (upstream) zone, adjacent to a first feed port, can be configured with 180 mm of forward conveying elements followed by 60 mm of forward tooth mixing elements. The second and third zones (and, possibly, the fourth) can each be configured with 90 mm of forward conveying elements, followed by 120 mm of forward turbine elements, followed by 30 mm of reverse conveying elements. At the downstream end of the gum base mixing section (i.e. at the end of the third or fourth zone), a disk element can be employed to restrict the flow of the gum base ingredients, causing localized filling of the mixer and better mixing of the gum base ingredients.

Beginning downstream from the gum base mixing section (i.e. near the beginning of the fourth or fifth zone), and continuing throughout the remainder of each ZSK 58 mixer, forward conveying elements can be used exclusively or can be combined with occasional groups of kneading blocks to ensure product homogeneity. This conveying and light kneading arrangement provides a more gentle distributive mixing of the remaining (non-base) chewing gum ingredients with the gum base ingredients in the final zones of each ZSK 58 mixer. Another major feed port, used for adding bulk sweeteners and other non-base ingredients, is provided at the beginning of the first chewing gum mixing zone, just downstream from the last gum base mixing zone.

To ensure proper mixing, the six zones can be set to temperatures (°C.) of 120, 110, 80, 49, 49 and 49, respectively. The specific ingredients can be added as follows, for each of the ZSK 58 continuous mixers.

Into the first major port, located in the first zone, is added 60 lbs/hr of molten gum base concentrate from Example 4 and 4.95 lb/hr of polyisobutylene. Into liquid injection ports located in the second and third zones (at the start of each group of turbine elements), a mixture of 14% lecithin and 86% fat can be added at a total rate of 19.5 lbs/hr. The gum base concentrate can thus comprise about 71% of the total gum base.

Into the second major feed port (in the fourth zone, assuming the gum base manufacture is completed in zone 3) can be added 206 lbs/hr of sugar, 40 lbs/hr of dextrose monohydrate, 5.20 lbs/hr of encapsulated aspartame, and 4.80 lbs/hr of encapsulated acesultame K. Also, a mixture of 10% glycerin and 90% corn syrup can be added at 53.2 lbs/hr into the fourth zone, using a liquid injection port just downstream from the major feed port.

Finally, a mixture of 6% lecithin and 94% wintergreen flavor can be added at 6.80 lbs/hr using a liquid injection port in the sixth zone. The result will be a wintergreen-flavored chewing gum, produced at 400 lbs/hr by each of the two ZSK 58 continuous mixers.

It may be desirable to vary the above process somewhat for optimization purposes. The above-disclosed screw configuration, process conditions, and addition sequence reflect the best information known at the present time for this process.

It should be appreciated that the method of the present invention is capable of being incorporated in the form of a variety of embodiments, only a few of which have been illustrated and described above. The invention may be embodied in other forms without departing from its spirit or essential characteristics. It will be appreciated that the addition of certain other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A method of making chewing gum in a continuous mixer, comprising the steps of:
    a) preparing a gum base concentrate in a separate mixer, the gum base concentrate including less than all the ingredients of a finished gum base but comprising at least an elastomer and a second component selected from the group consisting of elastomer plasticizers, waxes, fillers, and softeners/emulsifiers;
    b) continuously feeding the gum base concentrate into the continuous mixer;
    c) continuously feeding additional gum base ingredients and ingredient portions not included in the concentrate into the continuous mixer, the additional ingredients and ingredient portions being selected from the group consisting of elastomers, elastomer plasticizers, waxes, fillers and softener/emulsifiers;
    d) forming a finished gum base in the continuous mixer by mixing the gum base concentrate with the additional gum base ingredients and ingredient portions not included in the concentrate to form a gum base which includes about 5–95% by weight elastomer, zero to about 75% by weight elastomer plasticizer, zero to about 30% by weight wax, about 1–60% by weight filler, and about 0.5–40% by weight softeners/emulsifiers;
    e) continuously feeding at least one sweetener and at least one flavor into the continuous mixer; and
    f) mixing said sweetener and flavor with the finished base formed in the continuous mixer to form a chewing gum product.

2. The method of claim 1, wherein steps b)–f) are performed using a mixing L/D of not more than about 40.

3. The method of claim 2, wherein steps b)–d) are performed using a mixing L/D of not more than about 25.

4. The method of claim 2, wherein steps e) and f) is performed using a mixing L/D of not more than about 25.

5. The method of claim 1, wherein steps b)–f) are performed using a total mixing L/D of not more than about 30.

6. The method of claim 5, wherein steps b)–d) are performed using a mixing L/D of not more than about 25.

7. The method of claim 5, wherein steps e) and f) is performed using a mixing L/D of not more than about 15.

8. The method of claim 1, wherein steps b)–f) are performed using a total mixing L/D of not more than about 20.

9. The method of claim 8, wherein steps b)–d) are performed using a mixing L/D of not more than about 15.

10. The method of claim 8, wherein steps e) and f) is performed using a mixing L/D of not more than about 10.

11. The method of claim 1 wherein the gum base concentrate comprises about 50% to about 70% of the finished gum gum base.

12. The method of claim 1 wherein the gum base concentrate comprises an elastomer, a filler and an elastomer plasticizer.

13. A method of making chewing gum in a continuous mixer, comprising the steps of:
    a) providing a gum base concentrate separate from the continuous mixer which includes a mixture of at least a high molecular weight elastomer and a second component selected from the group consisting of fillers, elastomer plasticizers, and combinations thereof;
    b) continuously feeding the gum base concentrate into the continuous chewing gum mixer;
    c) continuously feeding additional ingredients into the continuous mixer which are necessary to form a finished gum base, the finished gum base including about 5–95% by weight elastomer, zero to about 75% by weight elastomer plasticizer, zero to about 30% by weight wax, about 1–60% by weight filler, and about 0.5–40% by weight softeners/emulsifiers;
    d) forming the finished gum base in the continuous mixer by continuously mixing the additional ingredients listed in step c) with the gum base concentrate described in step a);
    e) continuously feeding at least one sweetener and at least one flavoring agent into the continuous mixer;
    f) continuously mixing the ingredients listed in step e) with the ingredients listed in steps a) and c) to form a chewing gum product; and
    g) continuously discharging the chewing gum product from the continuous mixer.

14. The method of claim 13, wherein the gum base concentrate is prepared using a batch mixer.

15. The method of claim 14, wherein the batch mixer comprises a sigma blade mixer.

16. The method of claim 13, wherein the gum base concentrate is prepared using a continuous mixer.

17. The method of claim 16, wherein the continuous base concentrate mixer comprises a paddle mixer.

18. The method of claim 16, wherein the continuous base concentrate mixer comprises a blade-and-pin mixer.

19. The method of claim 16, wherein the continuous base concentrate mixer comprises a corotating twin-screw extruder.

20. The method of claim 16, wherein the continuous base concentrate mixer comprises a counterrotating twin screw extruder.

21. The method of claim 13, wherein the continuous chewing gum mixer comprises a blade-and-pin mixer.

22. The method of claim 13, wherein the continuous chewing gum mixer comprises a corotating twin-screw extruder.

23. The method of claim 13, wherein the continuous chewing gum mixer comprises a counterrotating twin screw extruder.

24. The method of claim 13, wherein the continuous chewing gum mixer comprises a paddle mixer.

25. The method of claim 13, wherein the continuous chewing gum mixer comprises a single screw extruder.

26. The method of claim 13, wherein the gum base concentrate comprises at least an elastomer, filler and elastomer plasticizer.

27. The method of claim 13, wherein the high molecular weight elastomer in the gum base concentrate comprises a synthetic elastomer selected from the group consisting of polyisobutylene, polybutadiene, isobutylene-isoprene copolymer, styrene-butadiene copolymer, polyvinyl acetate, vinyl acetate-vinyl laureate copolymer, polyethylene, ethylene vinyl acetate, and mixtures thereof.

28. The method of claim 13, wherein the gum base concentrate comprises a filler selected from the group consisting of magnesium carbonate, calcium carbonate, limestone, magnesium silicate, aluminum silicate, clay, alumina, talc, titanium oxide, monocalcium phosphate, dicalcium phosphate, tricalcium phosphate, cellulose polymers, and mixtures thereof.

29. The method of claim 13, wherein the gum base concentrate comprises a lubricant material selected from the group consisting of softeners/emulsifiers, elastomer plasticizers, low molecular weight elastomers, and combinations thereof.

30. The method of claim 13, wherein the elastomer constitutes about 5 to about 60% by weight of the gum base concentrate.

31. The method of claim 13, wherein the elastomer constitutes about 8 to about 40% by weight of the gum base concentrate.

32. The method of claim 13, wherein the gum base concentrate includes filler in an amount up to about 60% by weight of the concentrate.

33. The method of claim 32, wherein the filler is present at about 8 to about 40% by weight of the concentrate.

34. The method of claim 13, wherein the gum base concentrate includes lubricant in an amount up to about 90% by weight of the concentrate.

35. The method of claim 34, wherein the lubricant is present at about 40 to about 80% by weight of the concentrate.

36. The method of claim 13 wherein the gum base concentrate comprises about 50% to about 70% of the finished gum gum base.

* * * * *